United States Patent
Lefler et al.

(10) Patent No.: US 11,416,585 B2
(45) Date of Patent: Aug. 16, 2022

(54) DEFINE RETURN VALUE AT RUNTIME

(71) Applicant: Disney Enterprises, Inc., Burbank, CA (US)

(72) Inventors: Nathan Lefler, New York, NY (US); James A. Corrigan-Colville, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 193 days.

(21) Appl. No.: 16/718,601

(22) Filed: Dec. 18, 2019

(65) Prior Publication Data

US 2021/0192026 A1    Jun. 24, 2021

(51) Int. Cl.
- G06F 21/00 (2013.01)
- G06F 21/12 (2013.01)
- G06F 21/44 (2013.01)
- G06F 21/32 (2013.01)

(52) U.S. Cl.
CPC ............ G06F 21/121 (2013.01); G06F 21/32 (2013.01); G06F 21/44 (2013.01)

(58) Field of Classification Search
CPC ........ G06F 21/121; G06F 21/44; G06F 21/32; G06F 2221/0748
See application file for complete search history.

(56) References Cited

U.S. PATENT DOCUMENTS

| | | | | |
|---|---|---|---|---|
| 7,287,166 B1* | 10/2007 | Chang | ..................... | G06F 21/54 713/176 |
| 8,024,781 B2* | 9/2011 | Saunders | ............ | G06F 21/6209 726/5 |
| 9,946,856 B1* | 4/2018 | Grigera | ............... | G06F 21/6245 |
| 10,146,922 B2* | 12/2018 | Guidotti | ................... | G06F 21/45 |
| 10,338,906 B2* | 7/2019 | Branson | ..................... | G06F 8/34 |
| 2013/0066955 A1* | 3/2013 | Neel | ....................... | H04L 67/42 709/203 |
| 2013/0339498 A1* | 12/2013 | Johnson | ................ | H04W 4/029 709/221 |
| 2015/0161386 A1* | 6/2015 | Gupta | ..................... | G06F 21/44 726/23 |
| 2017/0093877 A1* | 3/2017 | Ganda | ..................... | G06F 21/53 |
| 2017/0344731 A1* | 11/2017 | Gefflaut | ............. | G06F 21/6218 |
| 2020/0089898 A1* | 3/2020 | Borkar | .................. | G06F 16/986 |

(Continued)

OTHER PUBLICATIONS

Naumovich et al., "Preventing piracy, reverse engineering, and tampering", Computer, vol. 36, Issue: 7, Jul. (Year: 2003).*

(Continued)

*Primary Examiner* — Morshed Mehedi
(74) *Attorney, Agent, or Firm* — Patterson + Sheridan, LLP

(57) ABSTRACT

The exemplary embodiments are related to a device, a system, and a method for implementing a mechanism that is configured to prevent the unauthorized execution of software. A user device is configured to execute a feature access function corresponding to an application feature included in an application. The feature access function is configured to receive one of a plurality of values each time the application is launched. During operation, the feature access function receives a value and determines whether a condition is satisfied. When the condition is satisfied, the value is returned which indicates that execution of the application feature is permitted.

20 Claims, 2 Drawing Sheets

(56) References Cited

U.S. PATENT DOCUMENTS

2020/0274898 A1\* 8/2020 Xie ................. G06F 21/554
2021/0133670 A1\* 5/2021 Cella ................ H04L 9/3239

OTHER PUBLICATIONS

Alkabani et al., "Remote activation of ICs for piracy prevention and digital right management", 2007 IEEE/ACM International Conference on Computer-Aided Design, Date of Conference: Nov. 4-8 (Year: 2007).\*

\* cited by examiner

DEFINE RETURN VALUE AT RUNTIME

BACKGROUND INFORMATION

An application may be configured with any of a variety of different application features. The application may restrict access to a particular application feature based on whether a predetermined condition is satisfied. For example, access to multimedia data (e.g., video, audio, text, etc.) may be based on whether login credentials are associated with an active subscription.

Under conventional circumstances, the developer may implement a Boolean function to restrict access to the application feature. The Boolean function may be configured to evaluate any of a plurality of factors to determine whether a predetermined condition is satisfied. If the Boolean function determines that access to the application feature is permitted (e.g., the predetermined condition is satisfied), the function may return a known value which represents true. Subsequently, the application may execute the machine code of the corresponding application feature. Alternatively, if the Boolean function determines that access to the feature is not permitted (e.g., the predetermined condition is not satisfied), the function may return a known value which represents false and the machine code of the corresponding application feature is not to be executed.

To provide a general example of when this type of conventional Boolean function may be executed, consider the following exemplary scenario. The user device is powered on, an operating system has been booted, the application's machine code is included in storage and the application is available for user selection. Subsequently, the application may be selected by the user via user input. This may trigger the application to launch which may include a mechanism loading the application's machine code into memory for execution.

From the user perspective, as the application loads, the user may be presented with various graphics. During runtime, the user may be presented with one or more graphical user interfaces (GUIs). For instance, the user may initially be presented with a GUI that requests a username and password. When the user submits the username and password, the application may communicate with a server via a network connection. In response, the server may indicate to the application whether the submitted username and password are associated with an active subscription. If the credentials are associated with the active subscription, the Boolean function may return the known value for true. Subsequently, the user may be presented with another GUI that includes various application features. If the credentials are not associated with the active subscription, the Boolean function may return the known value for false. Subsequently, the user may be presented with an indication that access to the application feature is not authorized.

A common technique for application piracy is to configure a software mechanism into the application that overwrites the Boolean function. The piracy mechanism takes advantage of the known value that represents true and alters the output of the Boolean function such that the function always returns true. Thus, access to the application feature may occur when the corresponding predetermined condition is not satisfied. As a result, a user who is not authorized to access the feature may access the feature of the application via their user device. Accordingly, there is a need to improve how the application determines whether access to a particular application feature is permitted.

DETAILED DESCRIPTION

Figure 1:
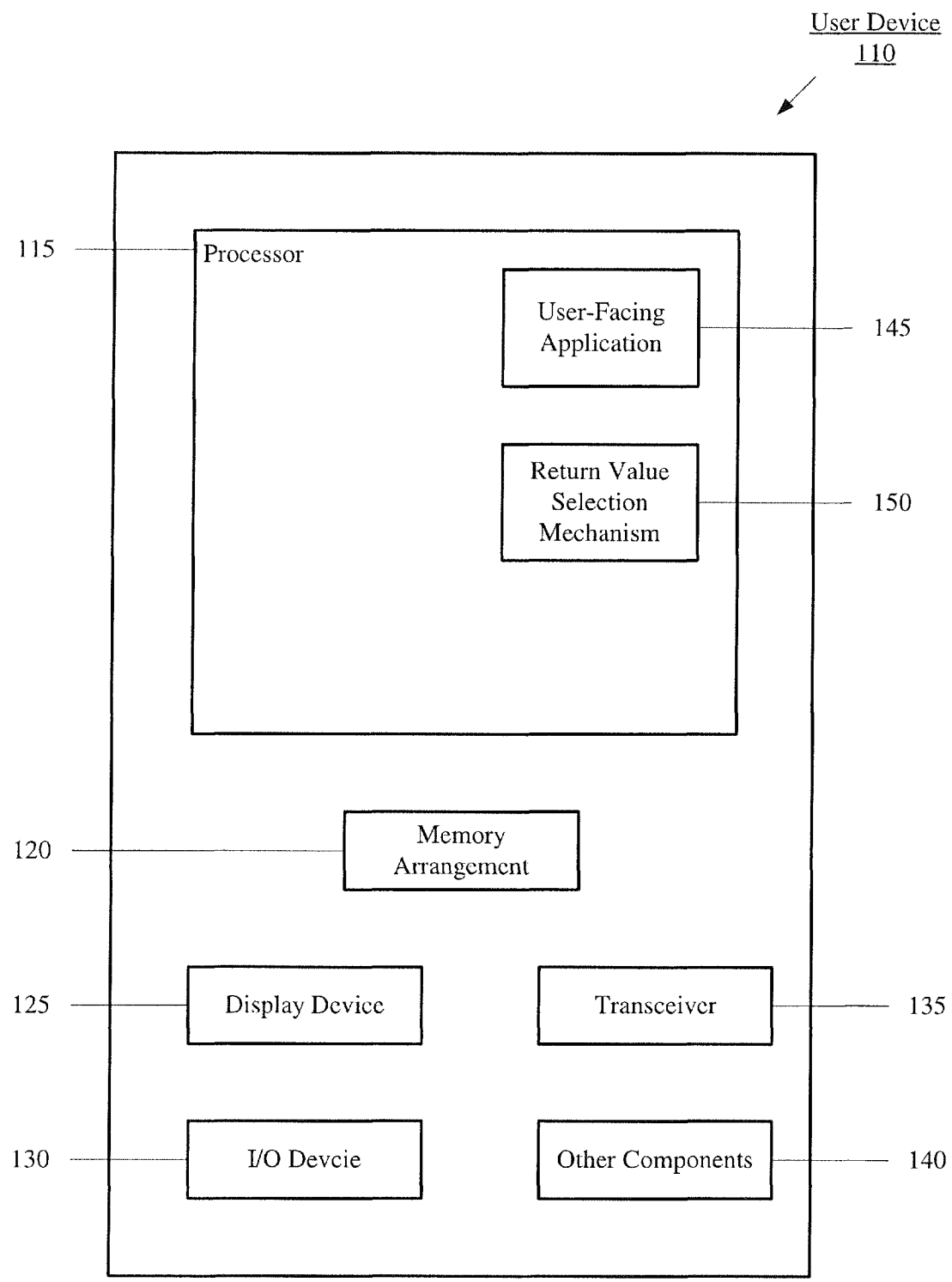
FIG. 1 shows an exemplary user device according to various exemplary embodiments.

The exemplary embodiments may be further understood with reference to the following description and the related appended drawings, wherein like elements are provided with the same reference numerals. The exemplary embodiments are related to a device, a system, and a method for implementing a mechanism that is configured to prevent the unauthorized execution of software. As indicated above, a malicious person may take advantage of the conventional programing technique in which a function returns "true" and incorporate piracy-enabling software into the application that alters the output of the Boolean function such that the function always returns true. This allows an unauthorized user to access the corresponding application feature. The exemplary embodiments are described with regard to a user device that is equipped with a feature access function that is configured to thwart the piracy-enabling software. Instead of returning true, a value that is to be returned by the feature access function is selected and defined at runtime. As will be described below, this provides an improvement to computer technology by equipping the user device with an unconventional mechanism.

The exemplary embodiments are described with regard to a user-facing application running on a user device. A user-facing application generally refers to an application that is configured for user interaction. However, any reference to the application being a particular type of application or the user device being a particular type of device is only provided for illustrative purposes. The exemplary embodiments may apply to any type of software being executed by any type of electronic device equipped with the appropriate hardware.

The user-facing application may include any of a variety of different application features. The exemplary embodiments are related to a mechanism that is configured to determine whether access to a particular application feature is permitted. Throughout this description, the term "application feature" may refer to any aspect of the application that is a result of executing machine code. For example, the term application feature may refer to any of the following aspects: a graphic, an animation, a media player, a web browser, a graphical user interface (GUI), multimedia data (e.g., video, audio, text, a combination thereof, etc.), access to a database, a software tool, a display setting (e.g., dark mode, a GUI format, aspect ratio, font size, etc.), a component configured to respond to input, an advertisement, a web feed, an aspect of a video game, a component configured to alter or enhance media (e.g., apply a filter, crop, convert file format, etc.) or a component configured to group data (e.g., create a photo album, create a playlist, etc.). These exemplary aspects of the application are only provided for illustrative purposes and are not intended to limit the term application feature to any particular aspect.

Each application feature may be represented by various programming constructs (e.g., methods, functions, procedures, system calls, conditional statements, etc.). During runtime, the executed machine code may include instructions that represent various programming constructs for the application features. For example, an application feature such as a video player may be based on one or more functions. To provide the functionality of the video player to the user, the portion of the machine code corresponding to the one or more functions may be executed.

Certain application features may not be intended to be accessible to any user who has access to the application. Instead, the application feature may be intended to be accessible only when a predetermined condition is satisfied. A developer may configure the application such that a user may be able to launch an application on a user device but may only be able to access the application feature when the predetermined condition is satisfied.

In a first example, the operating system of the user device 110 may be configured to only execute applications that are equipped with the appropriate signature. For instance, the operating system of the user device may be configured to only permit the execution of software that is associated with a signature from an authorized software distributor. In another example, a developer may only intend a particular application feature (e.g., a video player, a commercial free setting, multimedia data) to be available to users who have an active subscription associated with the application. In a further example, the developer may only intend streaming video of an event to be available to users who are located within a particular geographical location. In another example, the developer may only intend an aspect of a video game to be available to users who have completed a certain amount of in-game achievements. These exemplary scenarios are only intended to provide a general example of why access to an application feature may be restricted and are not intended to limit the exemplary embodiments to restricting access to any particular type of application feature for any particular reason. The exemplary embodiments may apply to any type of programming construct configured to evaluate a predetermined condition prior to executing a particular portion of machine code.

The exemplary embodiments relate to managing access to an application feature using a function that is configured to return a value that is defined at runtime when access to the application feature is permitted. By returning a value selected at runtime instead of the conventional known value, the exemplary function cannot be overwritten to always return the known value that represents true. Throughout this description, the term "runtime" generally refers to the duration of time between when the application's machine code is loaded into the volatile memory for execution and when the application is closed. Accordingly, the exemplary embodiments provide an application that is less susceptible to piracy.

FIG. 1 shows an exemplary user device 110 according to various exemplary embodiments. Those skilled in the art will understand that the user device 110 may be any type of electronic component that is configured to execute software or firmware, e.g., a desktop computer, a mobile phone, a tablet computer, a smartphone, phablets, embedded devices, wearable device, Internet of Things (IoT) devices, etc. Accordingly, the user device 110 may represent any electronic device.

The user device 110 may include a processor 115, a memory arrangement 120, a display device 125, an input/output (I/O) device 130, a transceiver 135, and other components 140. The other components 140 may include, for example, an audio input device, an audio output device, a battery that provides a limited power supply, a data acquisition device, ports to electrically connect the user device 110 to other electronic devices, ports that provide a wired connection to an internet protocol (IP) based network, etc.

The processor 115 may be configured to execute a plurality of applications of the user device 110. For example, the applications may include a user-facing application 145. The user-facing application 145 may be configured to include any of a variety of different application features (e.g., a video player, a web feed, various GUIs, various graphics, various animations, etc.). In some embodiments, the user-facing application 145 may include a return value selection mechanism 150. In other embodiments, the return value selection mechanism 150 may be a separate piece of software. The return value selection mechanism 150 may be configured to select a value that is to be returned by one or more functions when access to an application feature is permitted.

The user-facing application 145 and the return value selection mechanism 150 being executed by the processor 115 is only exemplary. The functionality associated with the user-facing application 145 and the return value selection mechanism 150 may also be represented as separate incorporated components of the UE 110 or may be a modular component coupled to the UE 110, e.g., an integrated circuit with or without firmware. For example, the integrated circuit may include input circuitry to receive signals and processing circuitry to process the signals and other information. In addition, in some user devices, the functionality described for the processor 115 is split among two or more processors. The exemplary embodiments may be implemented in any of these or other configurations of a user device.

The memory arrangement 120 may be a hardware component configured to store data related to operations performed by the user device 110. The display device 125 may be a hardware component configured to display data or other information to a user while the I/O device 130 may be a hardware component that enables the user to enter inputs. The display device 125 and the I/O device 130 may be separate components or integrated together such as a touchscreen. The transceiver 135 may be a hardware component configured to establish a connection with a wired or wireless network, e.g., a cellular network, a wireless local area network (WLAN), etc.

Figure 2:
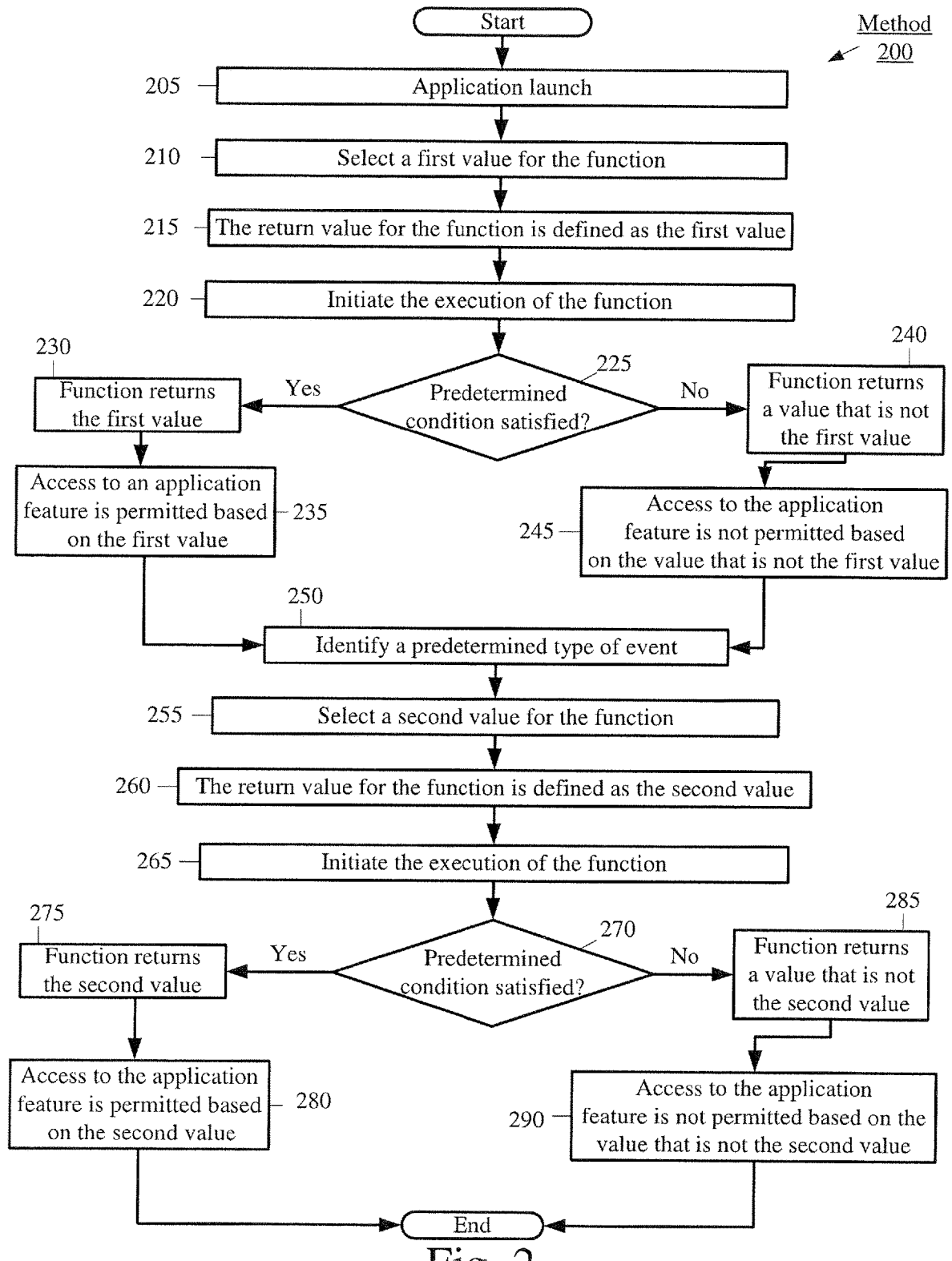
FIG. 2 shows an exemplary method for the user-facing application to execute a function that returns a value defined at runtime according to various exemplary embodiments.

FIG. 2 shows an exemplary method 200 for the user-facing application 145 to execute a function that returns a value defined at runtime according to various exemplary embodiments. The method 200 will be described with regard to the user device 110 of FIG. 1.

In 205, the user-facing application 145 is launched. For example, a user-initiated action at the user device 110 may initiate the launch (e.g., selection of an icon). In response, the user-facing application 145 machine code may be loaded from the memory arrangement 120 for execution.

The user-facing application 145 may include various application features. Access to one or more of the application features may be based on whether a predetermined condition is satisfied. In this example, a function of the user-facing application 145 is configured to perform the task of determining whether access to the one or more application features is permitted.

In 210, the user-facing application 145 selects a first value for the function. As will be described below, when the function determines that access to the application feature is to be permitted, the function will return the first value. Thus, unlike the conventional Boolean function described above that returns a known value that represents true, this exemplary function returns a value that is selected at runtime.

The first value may be randomly selected. This ensures that the first value cannot be predicted prior to runtime and thus, be utilized to overwrite the function. In some embodiments, this may include utilizing a random number generator. The random number generator may use one or more sources to generate the random value. In other embodiments, the first value may be based on randomly selecting a value from a set of predetermined values. However, these examples are only provided for illustrative purposes. A person of ordinary skill in the art would understand that any appropriate mechanism may be utilized to generate or select the first value.

In 215, the return value for the function that indicates that access to the corresponding application feature is to be permitted is defined as the first value. For instance, the function may be configured to return an integer when access is determined to be permitted. The value of the integer may be set to the first value. The first value may be stored in one or more of the user-facing application 134 machine code, in a library which the user-facing application 134 loads or any other location appropriate for this type of return value. In some embodiments, the first value is defined for one or more functions configured to determine whether access to application features are permitted. In other embodiments, a different first value is defined for each function.

In 220, the user-facing application 145 initiates the execution of the function. The execution of the function may be triggered based on any of a plurality of factors such as, but not limited to, user input, the execution of a particular portion of machine code, receiving a signal from a server over the network connection, receiving information from a component or application included in the user device 110, etc. However, the exemplary embodiments apply to the execution of the function being triggered for any appropriate reason.

In 225, the user-facing application 145 determines whether a predetermined condition is satisfied. The predetermined condition may indicate to the user-facing application 145 that access to the corresponding application feature is authorized. As mentioned above, the developer may restrict access to an application feature for any of a plurality of different reasons (e.g., active subscription, geographical location, in-game achievements, etc.). Accordingly, the predetermined condition in 225 may be based on any of a variety of factors including but not limited to, user input, login credentials, information stored on the user device 110, information received from a server, information received from another application or component of the user device 110, information associated with in-game achievements or progress, an active subscription, payment confirmation, a combination thereof, etc. However, the exemplary embodiments may apply to the predetermined condition being based on any appropriate one or more factors. If the predetermined condition is satisfied the method 200 continues to 230 and if the predetermined condition is not satisfied the method 200 continues to 240.

Since the predetermined condition is satisfied in 225, in 230 the function returns the first value. This indicates to the user-facing application 145 that access to the corresponding application feature is permitted.

In 235, the user-facing application 145 determines that access to the application feature is permitted based on the first value. From the user perspective, this may trigger a display that includes the application feature or the ability to interact with the application feature. For example, the user may now be presented with a GUI that includes icons the user may select. When selected, the icons may launch a media player that is configured to stream multimedia data. From the perspective of the user-facing application 145, this may include making the portion of machine code corresponding to the application feature available for execution.

Returning to 225, when the predetermined condition is not satisfied the method 200 continues to 240. In 240, the function returns a value that is not the first value. This indicates to the user-facing application 145 that access to the corresponding application feature is not permitted.

In 245, the user-facing application 145 determines that access to the application feature is not permitted based on the returned value that is not the first value. From the user perspective, this may trigger the display of a dialog box that states access is not permitted or password is invalid.

In 250, the user-facing application 145 identifies a predetermined type of event. As will be described below, the event may trigger the user-facing application 145 to redefine the value that is to be returned when the function determines that access to the application feature is permitted. This allows the value that is to be returned when the function determines that access to the application feature is permitted to be defined on a per application session basis.

The predetermined type of event may be when the application is launched. However, in some embodiments, the event may be the expiration of a timer, the execution of the function one or more times or detecting that an unauthorized software mechanism has been inserted into the machine code of the user-facing application 145. However, these exemplary events are only provided for illustrative purposes, the exemplary embodiments may apply to any appropriate type of event triggering the user-facing application 145 to define the value that is to be returned when the function determines that access to the application feature is permitted.

Embodiments of the invention can thwart a piracy mechanism such as piracy-enabling software that may be loaded by a malicious person prior to the launch of the user-facing application 145. The malicious person may take advantage of the conventional programing technique in which a function returns "true" and incorporate piracy-enabling software into the application that alters the output of the Boolean function such that the function always returns true. Since the piracy mechanism assumes that function is configured to true, the piracy mechanism can gain unauthorized access to the application feature by exploiting this conventional programming technique and altering the configuration of the function such that the function always returns true. The exemplary embodiments are not susceptible to this type of piracy mechanism because this conventional piracy mechanism is loaded prior to application launch and the return value of the exemplary embodiments is defined after the application launch. Thus, by defining the return value at runtime instead of utilizing the conventional known value that represents true, the exemplary function cannot be overwritten to always return true.

Accordingly, as will be shown below in 255-290, when the function is executed after the event in 250, a second value (that is different from the first value) is used to represent the value that is to be returned when the function determines that access to the application feature is permitted. Thus, even if the first value is determined by an attacker, it cannot be used to overwrite the function after the event in 250 is identified.

Another common application piracy technique is to replace the verification step (e.g., determining whether the predetermined condition is satisfied) with a different determination. Thus, instead of overwriting the function to always return true, the attacker may replace the verification step such that the predetermined condition is always satisfied. For example, a conventional application may implement an application programing interface (API) object to perform this verification step. API calls may be intercepted by a piracy mechanism that may change the arguments passed, execute the operation itself, or redirect the call. To further protect the user-facing application 145 from piracy, the exemplary function may be compiled directly into the machine code and does not require the use of a separate application programming interface (API) object. This ensures that an attacker cannot replace the verification step (e.g., determining whether the predetermined condition is satisfied) with a different determination. An exemplary representation of the function is provided below:

```
typedef unsigned int truth_t;
truth_t True = 0;
___attribute___((always_inline))
inline void generateTrue( ) {
        if (True != 0) {
                return;
        }
truth_t t = arc4random_uniform(UINT32_MAX);
NSUUID *uuid = [[NSUUID alloc] init];
uuid_t uuidBytes;
[uuid getUUIDBytes:uuidBytes];
  for (int i = 0; i < 16; i += 4) {
   unsigned int x = uuidBytes[i] << 24;
        x |= uuidBytes[i + 1] << 16;
        x |= uuidBytes[i + 2] << 8;
        x |= uuidBytes[i + 3];
            t ^= x;
}
        True = true;
}
```

Returning to the method 200, in 255 the user-facing application 145 selects a second value for the function. Like the first value used for the previous application, when the function determines that access to the application feature is to be permitted for this application launch, the function will return the second value. Selecting the second value is substantially similar to selecting the first value in 210. However, the second value is a different value than the first value. Defining a second value that is different from the first value ensures that the malicious person cannot determine the first value and utilize it to gain unauthorized access in a subsequent application launch. Under conventional circumstances, the value that represents true does not change per application launch. Thus, not only do the exemplary embodiments not use the conventional return value of true, the exemplary embodiments return a different unconventional value per application launch (or per any other appropriate predetermined condition).

In 260, the return value for the function that indicates that access to the corresponding application feature is to be permitted is defined as the second value. This is substantially similar to 215 where the return value is defined as the first value.

In 265, the user-facing application 145 initiates the execution of the function. This is the same function that is executed in 220. However, instead of being configured to return the first value this function is now configured to return the second value. In 270, the user-facing application 145 determines whether a predetermined condition is satisfied. This is the same predetermined condition evaluated in 225. If the predetermined condition is satisfied, the method 200 continues to 275. If the predetermined condition is not satisfied the method 200 continues to 285.

Since the predetermined condition is satisfied in 270, in 275 the function returns the second value. This indicates to the user-facing application 145 that access to the corresponding application feature is permitted.

In 280, the user-facing application 145 determines that access to the application feature is permitted based on the second value. Thus, after the first application launch in 205, the function is configured to return the first value if access to the application feature is permitted and after the event identified in 250, the function is configured to return the second value if access to the application feature is permitted. Accordingly, the value that is to be returned by the exemplary function may be frequently redefined during the lifespan of the user-facing application 145. Subsequently, the method 200 ends.

Returning to 270, when the predetermined condition is not satisfied the method 200 continues to 285. In 285, the function returns a value that is not the second value. This indicates to the user-facing application 145 that access to the corresponding application feature is not permitted. In 290, the user-facing application 145 determines that access to the application feature is not permitted based on the returned value that is not the second value. Subsequently, the method 200 ends.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a Linux based OS, a mobile device having an operating system such as iOS, Android, etc. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A user device, comprising:
   a memory arrangement; and
   a processor configured to execute a feature access function corresponding to an application feature included in an application, wherein the feature access function performs operations comprising:
      receiving a first value after the application is launched a first time for a first user in a first locale, wherein the feature access function is configured to receive one of a plurality of values each time the application is launched;
      determining that a feature access condition is satisfied for the launch the first time;
      based on determining that the feature access condition is satisfied for the launch the first time, returning the first value, wherein returning the first value indicates that execution of the application feature is permitted for the first user in the first locale;

receiving a second value, different from the first value, after the application is launched a second time for the first user in the first locale;

determining that the feature access condition is satisfied for the launch the second time; and based on determining that the feature access condition is satisfied for the launch the second time, returning the second value, wherein returning the second value indicates that execution of the application feature is permitted for the first user in the first locale.

2. The user device of claim 1, wherein the second value is the only value of the plurality of values that is configured to be returned when the condition is satisfied after the application is launched the second time.

3. The user device of claim 1, the operations further comprising:

determining that the feature access condition is not satisfied for a launch of the application a third time; and based on the determining that the feature access condition is not satisfied, returning a further value, wherein the further value is different from the second value.

4. The user device of claim 1, wherein determining that the feature access condition is satisfied for the launch the first time is based on one or more factors and wherein the one or more factors includes one or more of: (i) a signature, (ii) geographical location or (iii) login credentials.

5. A non-transitory computer-readable medium comprising instructions that, when executed by a processor, cause the processor to execute an application, wherein the application includes an application feature and a feature access function, the application configured to perform a feature access operation comprising:

selecting, during runtime for a first user in a first locale, a first value for the feature access function to return when the feature access function determines that access to the feature is permitted for the first user in the first locale;

determining, by the feature access function, that access to the application feature is permitted for the first user in the first locale;

returning, by the feature access function, the first value;

enabling the application feature for the first user in the first locale based on the feature access function returning the first value;

identifying a predetermined type of event;

selecting, during runtime and in response to the predetermined type of event, a second value for the feature access function to return when the feature access function determines that access to the feature is permitted for the first user in the first locale, wherein the second value is different from the first value and wherein, when the second value is selected, the first value no longer permits access to the application feature for the first user in the first locale;

determining, by the feature access function, that access to the application feature is permitted for the first user in the first locale after the event;

returning, by the feature access function, the second value; and enabling the application feature for the first user in the first locale based on the feature access function returning the second value.

6. The non-transitory computer-readable medium of claim 5, wherein the predetermined type of event is one of an application launch, an expiration of a timer or execution of the feature access function a predetermined number of times.

7. The non-transitory computer-readable medium of claim 5, wherein determining that access to the application feature is permitted for the first user in the first locale is based on one or more factors and wherein the one or more factors includes one or more of: (i) a signature, (ii) a geographical location, or (iii) login credentials.

8. The non-transitory computer-readable medium of claim 5, wherein the feature access function returns a value that is not the first value and not the second value when access to the application feature is not permitted.

9. The non-transitory computer-readable medium of claim 5, wherein the first value is a randomly selected from a set of values.

10. The non-transitory computer-readable medium of claim 5, wherein selecting the first value is performed after application launch.

11. A method to prevent circumvention of a feature access condition, comprising:

at an application running on a user device, wherein the application includes an application feature:

selecting, during runtime for a first user in a first locale, a first value for a feature access function to return when access to the application feature is permitted for the first user in the first locale;

determining, by the feature access function, that access to the application feature is permitted for the first user in the first locale;

returning, by the feature access function, the first value;

enabling the application feature for the first user in the first locale based on the feature access function returning the first value;

identifying a predetermined type of event;

selecting, during runtime and in response to the predetermined type of event, a second value for the feature access function to return when the feature access function determines that access to the feature is permitted for the first user in the first locale, wherein the second value is different from the first value and wherein, when the second value is selected, the first value no longer permits access to the application feature for the first user in the first locale;

determining, by the feature access function, that access to the application feature is permitted for the first user in the first locale after the event;

returning, by the feature access function, the second value; and enabling the application feature for the first user in the first locale based on the feature access function returning the second value.

12. The method of claim 11, wherein the predetermined type of event is an application launch.

13. The method of claim 11, wherein the predetermined type of event is one of an expiration of a timer or execution of the feature access function a predetermined number of times.

14. The method of claim 11, wherein determining that access to the application feature is permitted for the first user in the first locale is based on one or more factors and wherein the one or more factors includes one or more of: (i) a signature, (ii) geographical location, or (iii) login credentials.

15. The method of claim 11, wherein the feature access function returns a value that is not the first value and not the second value when access to the application feature is not permitted.

16. The method of claim 11, wherein selecting the first value is performed after application launch.

17. The method of claim 11, wherein the first value is a random value generated based on one or more sources.

18. The user device of claim 4, wherein the one or more factors consists of login credentials.

19. The non-transitory computer-readable medium of claim 7, wherein the one or more factors consists of login credentials.

20. The method of claim 14, wherein the one or more factors consists of login credentials.

* * * * *